Figure 1:
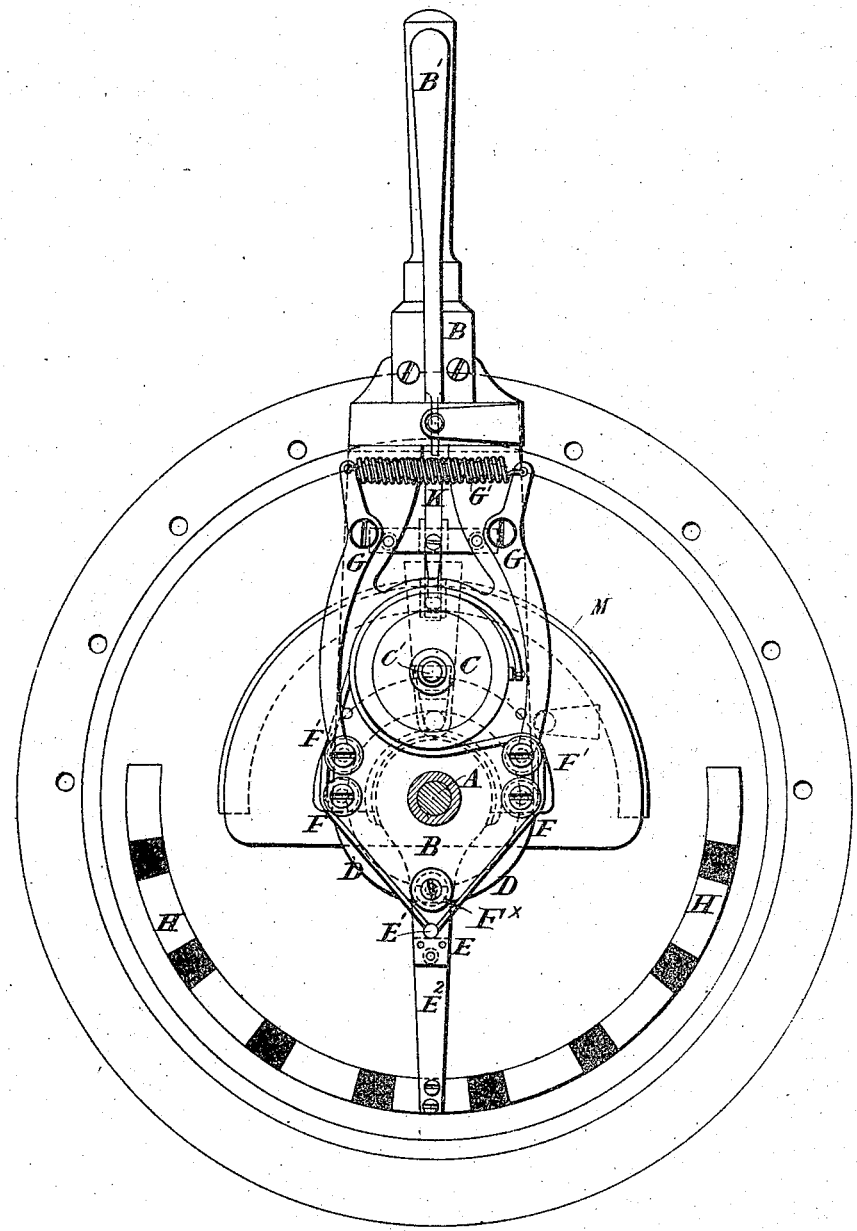

(No Model.)  5 Sheets—Sheet 1.

J. B. WILLIS.
TELEGRAPH APPARATUS FOR SHIPS.

No. 400,985. Patented Apr. 9, 1889.

Witnesses.  Inventor;

(No Model.)  5 Sheets—Sheet 2.
J. B. WILLIS.
TELEGRAPH APPARATUS FOR SHIPS.

No. 400,985.  Patented Apr. 9, 1889.

Witnesses.  Inventor
J. B. Willis (No Model.)

J. B. WILLIS.
TELEGRAPH APPARATUS FOR SHIPS.

No. 400,985. Patented Apr. 9, 1889.

(No Model.) 5 Sheets—Sheet 4.

J. B. WILLIS.
TELEGRAPH APPARATUS FOR SHIPS.

No. 400,985. Patented Apr. 9, 1889.

Witnesses,
Baltus D. Long,
Allan McLane Abell

Inventor
J. B. Willis
By attys
Baldwin, Hopkins & Peyton (No Model.)
J. B. WILLIS.
TELEGRAPH APPARATUS FOR SHIPS.
No. 400,985.　　　　　　　　　　　　　Patented Apr. 9, 1889.
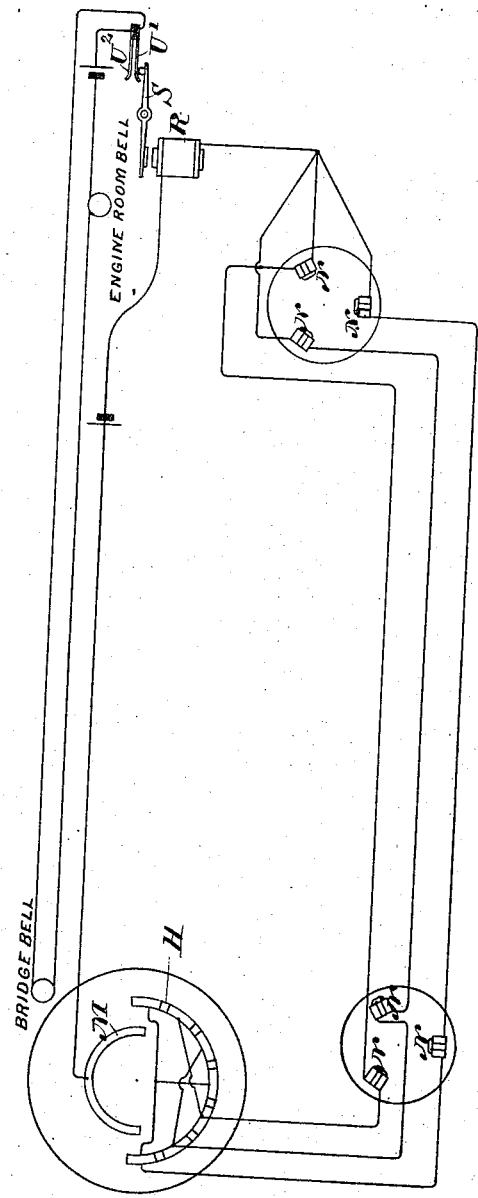
WITNESSES　　　　　　　　　　　　　　　　　INVENTOR.

United States Patent Office.

JAMES BONELLE WILLIS, OF PORTSMOUTH, COUNTY OF HANTS, ENGLAND.

TELEGRAPH APPARATUS FOR SHIPS.

SPECIFICATION forming part of Letters Patent No. 400,985, dated April 9, 1889.

Application filed February 7, 1888. Serial No. 263,256. (No model.) Patented in England January 18, 1887, No. 800; in France December 7, 1887, No. 187,446; in Belgium December 8, 1887, No. 79,839; in Germany December 21, 1887, No. 45,392; in Italy December 31, 1887, No. 22,756; in Norway February 6, 1888, No. 884; in Austria-Hungary March 29, 1888, No. 38/863; in Spain May 23, 1888, No. 7,945, and in Portugal June 6, 1888, No. 1,249.

*To all whom it may concern:*

Be it known that I, JAMES BONELLE WILLIS, draftsman and engineer, a subject of the Queen of Great Britain, residing at 1 Mill Lane, Mile End, Portsmouth, in the county of Hants, England, have invented certain new and useful Improvements in Telegraph Apparatus for Ships and other Purposes, (for which I have received Letters Patent in Great Britain, No. 800, dated January 18, 1887, sealed March 29, 1888; in France, No. 187,446, dated December 7, 1887; in Belgium, No. 79,839, dated December 8, 1887; in Austria-Hungary, No. 38/863, dated March 29, 1888; in Germany, No. 45,392, dated December 21, 1887; in Italy, No. 22,756, dated December 31, 1887; in Norway, No. 884, dated February 6, 1888; in Portugal, No. 1,249, dated June 6, 1888, and in Spain, No. 7,945, dated May 23, 1888,) of which the following is a specification.

This invention has for its object improvements in electric-telegraph apparatus suitable for use to communicate between the bridge and the engine-room of a steamship, and applicable, also, to other uses. The transmitting-instrument is provided with a handle movable around a stud or axis, which, by preference, is horizontal. This handle is intended to be placed in positions corresponding to the signals to be transmitted, such as "stop," "slow," "half-speed," and "full speed," both ahead and astern. Upon the handle-lever at a short distance from the axis a spring-drum is carried. Two chains pass around the drum and are led from it over guide-pulleys and attached to a contact-making arm. This arm is also movable around the central stud or axis, and it carries a spring contact-piece, which bears against a stationary arc, in which conducting and non-conducting strips are inserted at intervals. Around the central boss of this contact-arm gear-teeth are provided. They engage with a pinion which, through other toothed gear, drives a fly. This fly restrains the movement of the contact-arm and compels it to travel slowly, for the fly has to make many revolutions while the arm moves a comparatively small distance. The chains which connect the contact-arm with the drum upon the handle are directed by guide-pulleys, so that the chains approach the contact-arm from opposite sides. When the handle is moved to the one side, the chain passing to the other side of the arm is strained, and but for the rotation of the spring-drum the handle could not be moved rapidly. On the other hand, the chain on the side toward which the lever is moved is slackened and would fall loose, but that one of the pulleys over which it passes is movable and controlled by a light spring, so that this guide-pulley moves and takes up what would otherwise be the slack of the chain. Thus, however rapidly the handle may be moved from one position to another in order to transmit a fresh order to the engine-room, the contact arm will follow only at its leisure and at such a speed that the receiving-instrument can act with certainty. In addition to the parts already described, the transmitter also contains the following: The handle is provided with a locking-bolt which is lifted and released when the handle is gripped, and which, when the handle has been moved to a proper position for giving a signal, drops into a hole in the base or frame as soon as the handle is released. This bolt locks the handle so that it cannot be moved accidentally or otherwise, except when it is gripped with the hand. Fixed to the contact-arm there is a disk, and in the periphery of the disk is a notch. When the apparatus is at rest, the end of a small lever mounted on the handle drops into the notch. On this lever there is a spring, intended to close an electric circuit. When the handle is gripped, the lever is removed from the notch in the ring, and its contact-spring is caused to bear upon a metal arc, and so to close the main circuit, the course of which is hereinafter traced. When the handle is moved to one side or the other to give a signal, the lever, after being removed from the notch in the disk connected with the contact-arm, is carried with the handle away from the notch, so that its spring-contact is continued after the handle is released and until the comparatively slow movement of the contact-arm brings it and the notched disk to such a position that the end of the lever can enter the notch, which a spring causes it to do immediately, and the circuit through the apparatus is then open. The circuit, so far as it is contained in the transmitting-instrument, is traced from the line-wire to the conducting contact-strip on which the contact-arm bears, through the contact-arm and other parts to the contact-spring of the lever on the handle, and so to the insulated metal arc on which this contact-spring bears, and again to line. When the contact-arm travels off a conducting-strip, the circuit is for a time open, to be again closed when the contact-arm reaches the next contact-strip, and so on until the contact-arm comes to a stop on one of these conducting-strips and the lever on the handle enters the retaining-notch. The circuit is then opened independently of the contact-arm, and remains so until the handle of the signaling apparatus is again gripped and shifted to a new position. The receiving-instrument, say, in the engine-room is provided with three electro-magnets set around a central axis at an angular distance of one hundred and twenty degrees the one from the other. Each electro-magnet is provided with an armature movable around a stud or fulcrum at one end, and at the other connected by a rod with a pin set eccentrically upon a disk carried by the central axis. Each armature, when it is attracted, thrusts the axis round a third of a revolution, and, the magnets operating in due order, the rotation is maintained as long as may be necessary. This axis is geared by means of a pinion upon it with a toothed wheel upon another axis, and this axis carries an index which points on a dial to the signals as they are received. The index moves one space, or the interval between one signal and the next, as each electro-magnet attracts its armature, and so one, two, or three steps can be made for the fourth step. When this is required, the first magnet operates a second time in due sequence after the third magnet, and so, by the magnets operating in regular rotation, any desired number of steps, and in either direction, may be obtained. The transmitting-instrument, it will be understood, is provided with a separate contact-strip corresponding to each signal. There is also a fourth electro-magnet in the receiving-instrument, through the coils of which the current passes when it traverses the coils of either of the magnets previously mentioned. This fourth magnet serves to lift a brake-piece from the surface of a wheel on the axis of the index while the propelling-magnet is in operation. When the brake-magnet does not operate, a spring causes the return of the brake, and the index is then locked, so that it cannot by any accidental vibration be shifted from its true position. This brake-magnet also has another function. At the same time that it lifts the brake-piece it closes together two contact-springs, which form part of a separate circuit, including a battery and two electric bells. There is one bell in the engine-room near the indicator, and the other on the bridge with the transmitter; hence each time that the indicator passes from one signal to another the bells sound.

The main battery for working the apparatus is located in any convenient position and connected in series with the brake-magnet. The circuit from the battery passes through the brake-magnet, through one of the propelling-magnets, through the corresponding contact-piece in the transmitter, through the contact-arm of this instrument, and so to the arc with which the lever-spring closes contact. This arc is permanently connected with the other pole of the main battery.

In order that my said invention may be most fully understood and readily carried into effect, I will proceed to describe the drawings hereunto annexed.

Figure 2:
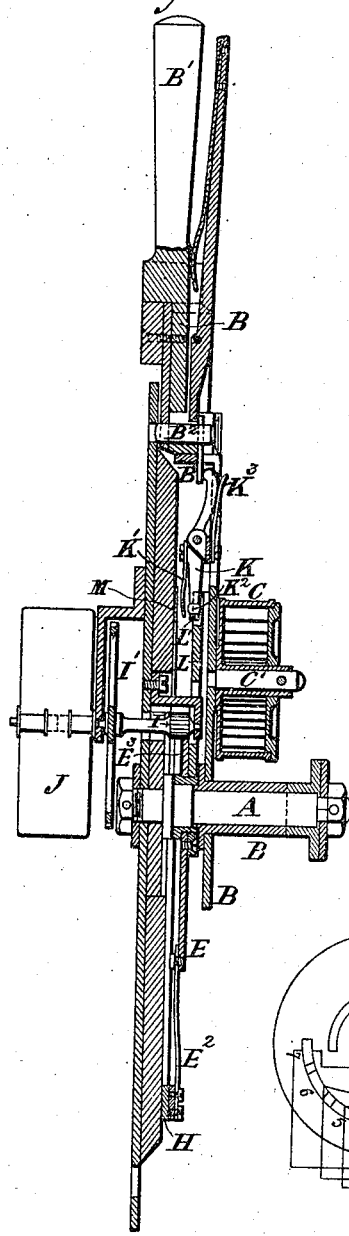
Figure 3:
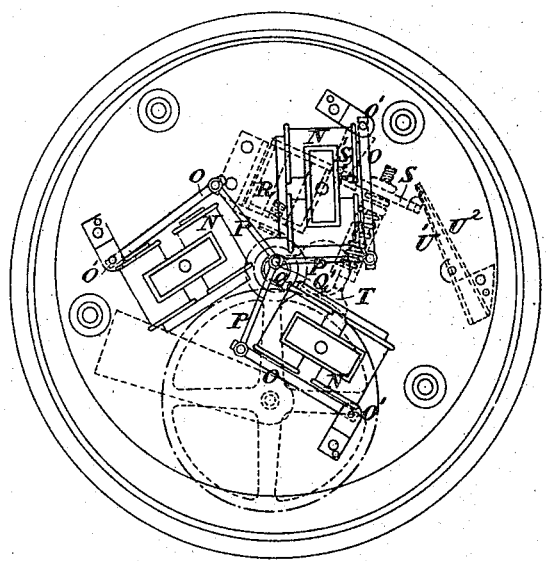
Figure 4:
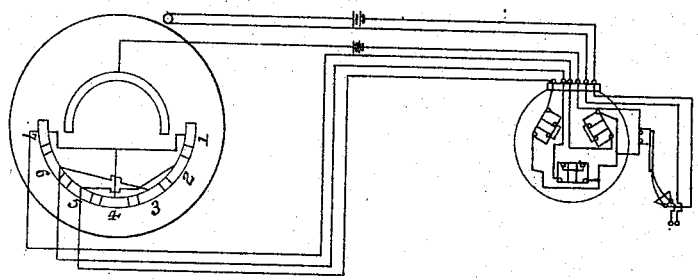
Figure 5:
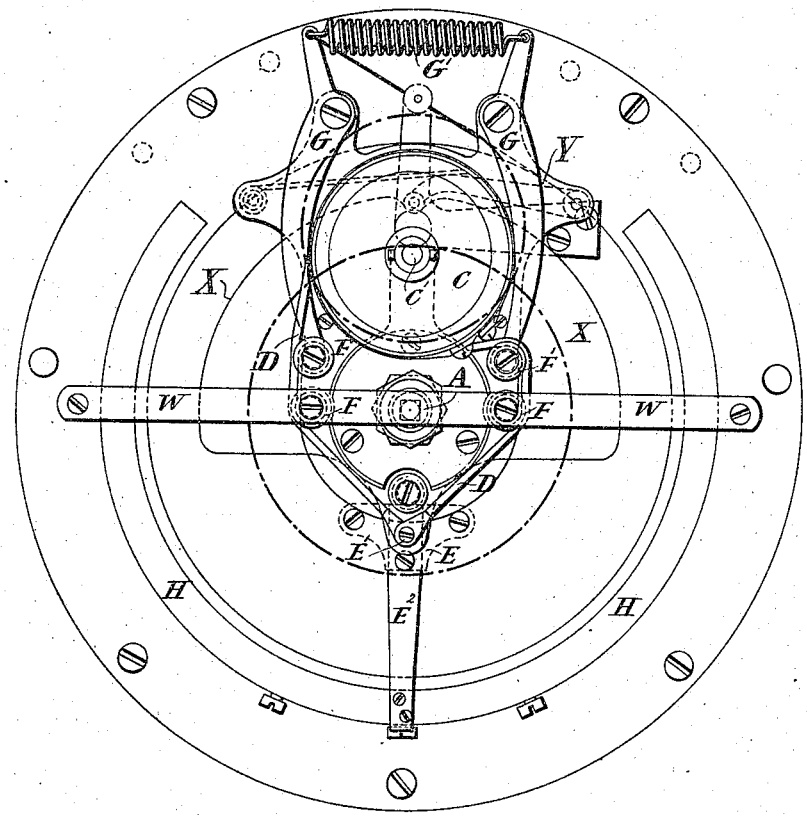
Figure 6:
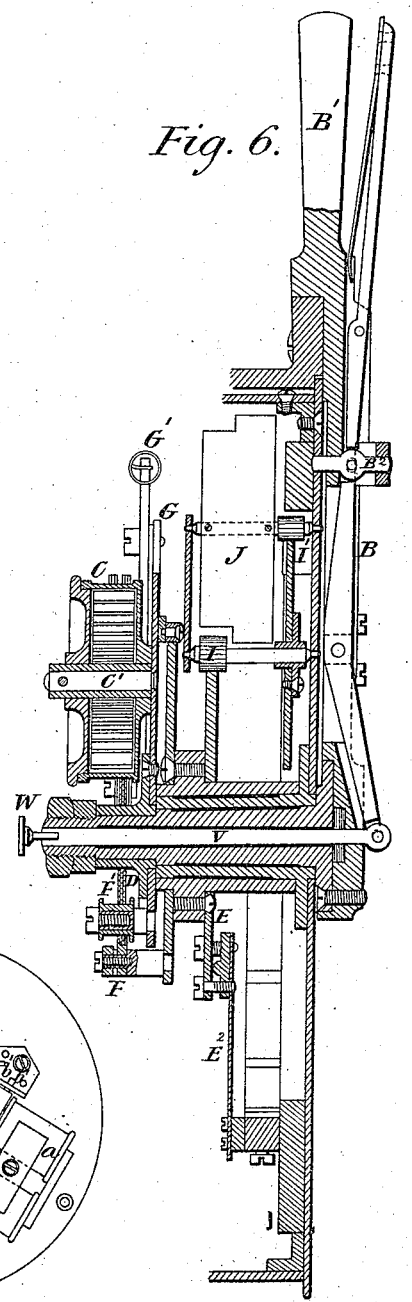
Figure 7:
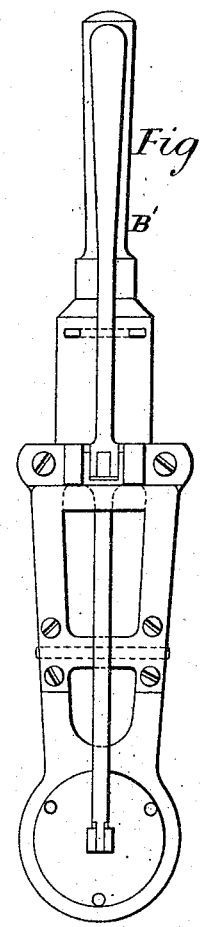
Figure 8:
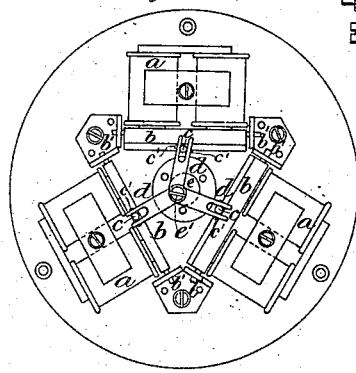
Figure 9:
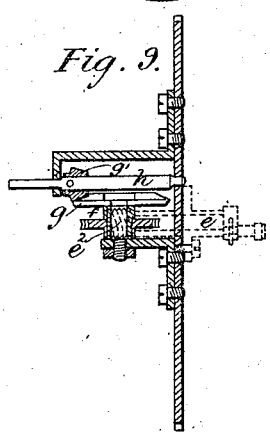

In the drawings, Figure 1 is a front elevation of transmitting apparatus arranged in accordance with my invention. It is shown with a portion of the casing removed and with the central stud or axis in section. Fig. 2 is a vertical section of this instrument, and in the figure part of the casing is omitted. Fig. 3 is an elevation of the receiver. Fig. 4 is a diagram illustrating the circuit-connections. Fig. 5 is a front elevation of a transmitter, differing in some of its details from that shown by Figs. 1 and 2. Some of the casing and some other parts are omitted from this figure. Fig. 6 is a vertical section of the transmitter shown by Fig. 5. Fig. 7 shows separately in elevation the handle of this instrument. Fig. 8 shows a receiver of modified form. Fig. 9 is a sectional elevation showing the gear which I prefer to employ in connection with this receiver; and Fig. 10 is a diagram showing circuit-connections with a receiver at the transmitter and in the engine-room, and a bell also at each place.

In Figs. 1 and 2, A is a fixed central stud or axis, preferably horizontal, and B is a hand-lever with handle B' movable around this stud or axis. $B^2$ is the locking-bolt, which, entering corresponding holes in the frame of the instrument, retains the handle in the position in which it has been placed. C is a drum containing a coiled steel spring. It is mounted upon a stud, C', fixed into the handle-lever B. D D are chains fixed to the periphery of the drum C and passing from it to the contact-making arm E and to a stud, E', upon which they are attached. The chains are directed by guide-pulleys F F', so that the chains are brought to the contact-arm from opposite sides. The guide-pulleys F F are mounted on studs fixed into the handle-lever B; but the axes of the guide-pulleys F' F' are carried by levers G G, which are movable upon the handle-lever B, and a coiled spring, G', connecting the shorter ends of the levers G, tends to separate the pulleys F' F', and so to prevent the chains from becoming slack. $F^x$ is also a roller or pulley carried by lever B below the bearing A, and also engages the cords D D as the lever B is moved. $E^2$ is a spring contact-piece at the extremity of the contact-arm E. It bears constantly upon an arc, H, and this arc is made up alternately of insulated conducting-strips and non-conducting spaces. The number of these conducting-strips will be different in different cases. There will be one conducting-strip for each signal which the instrument is arranged to transmit. The conducting-strips are preferably of brass, and they are connected with insulated wires passing from the transmitter to the receiver at a distance. There are, as is seen in Figs. 4 and 10, three such wires in connection with these insulated strips, and whatever be the number of strips employed the first, fourth, and the seventh strip will be connected with one wire, the second, fifth, and eighth with another wire, and the third, sixth, and the ninth with a third wire. Any greater or less number of conducting-strips will be connected in a similar manner. $E^3$ is an arc of teeth carried by the contact-arm E. It gears with a pinion, I, and on the same axis with the pinion there is a toothed wheel, I', which drives a pinion carrying upon its axis the fly J, so that whenever the contact-arm E moves the fly J revolves, and, as before explained, the resistance of this fly regulates the speed of the movement of the arm. K is a lever carried upon the handle-lever B, and on it is the small contact-spring K'. It also carries a pawl, $K^2$. The pawl $K^2$ drops into a notch, L', in a metal arc, L, fixed upon the contact-arm E. It is pressed up into this notch by the spring $K^3$. When, however, the handle is grasped and its locking-bolt $B^2$ disengaged, a pin, $B^X$, upon the locking-bolt operates against the tail of the lever K and displaces the pawl $K^2$ from the notch L'. At the same time it brings the contact-spring K' into contact with the insulated metal arc M, which remains always connected with the return-wire from the receiver, and this completes the electrical circuit, provided that a contact-piece be at the time bearing upon one of the insulated metal strips in the arc. If after grasping the handle it be moved around the stud A for the purpose of giving a signal, the pawl $K^2$ will pass away from the notch L' and the contact-spring K' will continue to bear on the metal arc M after the handle has been released and its bolt B has entered one of the holes in the frame provided to receive it; but when, in consequence of the movement of the contact-arm E, the notch L' is again brought to the pawl $K^2$ this will rise into the notch and the contact between the spring K' and the metal arc M will cease.

In the receiver represented by Fig. 3, N N N are three electro-magnets, each connected with a separate line-wire passing from the transmitter to the receiver, and all connected to the same return-wire. O O O are the armatures of these electro-magnets. They are pivoted at O', and their other or free ends have connecting-rods P P P jointed to them. These connecting-rods all embrace the same pin, Q', set eccentrically on the central axis, Q. This axis Q has a pinion upon it, and it drives another axis which carries a finger pointing upon a dial to words corresponding to the signals sent by the transmitter. R is a fourth electro-magnet which the receiver contains. Its coils are connected with the return-wire, so that when a current passes in either of the magnets N it also passes through the coils of the fourth magnet, R. S is the armature of this magnet. It is pivoted at S', and at the end opposite to that on which the electro-magnet operates it carries the pressure brake-block T by a spring-connection. An ivory button at the end of the armature-lever also bears upon the springs U' $U^2$, and when the magnet attracts the armature it presses these springs together and completes an additional electric circuit in which a bell or bells are included; but when the armature is not attracted the springs U' $U^2$ separate, and they move the armature-lever in such a manner as to bring the block T against the periphery of the toothed wheel on the axis which carries the indicating finger or pointer. I prefer to provide two receivers, one being placed with the transmitting-instrument on the bridge, so that it serves as an indicator to the operator.

The construction of the transmitter shown by Figs. 5, 6, and 7 is similar to that already described in respect to Figs. 1 and 2, the form of the parts, however, being varied. The figures are lettered to correspond with the description already given. The lever K, however, (shown in Figs. 1 and 2,) is dispensed with, and in its place the bolt of the lever-handle is connected in the manner shown with a central pin, V, so that when the bolt is withdrawn the pin carried in the end thereof is pressed inward, and it then makes electrical contact against the spring W. The closing of the circuit is thus made dependent upon the grip of the handle being maintained for a sufficient time, and this in practice will generally be found sufficient, for unless the contact-making arm be adjusted to move at an unnecessarily slow speed it will in all cases have arrived at the end of its journey before the handle has been brought correctly to the position at which it is to be left and the bolt on the handle has dropped into its hole to lock the handle in place. I, however, in any case provide a notched arc, X, upon the contact-making arm E, and I provide a pawl-lever, Y, upon the parts which are fixed to the lever-handle. The pawl-lever drops into the notch when the lever-handle and the contact-arm come together, and it thus aids in bringing the contact-arm to rest in the proper position.

In Fig. 8 another form of receiver is represented. $a\,a\,a$ are the three electro-magnets, as before. $b\,b\,b$ are their armatures. They are now pivoted by the lower edge at $b'\,b'$, and at the opposite edge they carry a pin, c, that is free to turn therein. On the head of the pin are pivots $c'\,c'$, and these enter holes in forked connecting-rods $d\,d\,d$, which all embrace an eccentric-pin, $e'$, on the end of the axis $e$. The axis $e$, as is shown by Fig. 9, has a worm, $e^2$, upon it, and this engages with a worm-wheel, $f$. $g$ is a beveled wheel on the same axis with the worm-wheel, and it gears with the beveled pinion $g'$ on the axis $h$, and it is this axis which carries the finger or pointer which indicates the signals upon the face of the dial. When gear of this description is employed, the fourth electro-magnet (shown in Fig. 3) may be dispensed with, for, however rapidly the instrument may be worked, the pointer cannot overrun, nor can it be accidentally displaced from its position by jars, such as the instrument may receive from the firing of guns or from other causes.

Having now particularly described and ascertained the nature of my said invention and in what manner the same is to be performed, I declare that what I claim is—

1. The combination, substantially as described, in an electric-telegraph transmitter, of a contact-making arm, a series of contacts over which it travels and to any one of which it may be moved, an electric signaling-circuit in which the arm and contacts are included, a movable handle whose movement is to be signaled, yieldingly coupled with said arm and by which the arm may be moved to any of said circuit-completing contacts, and a speed-controller connected with the contact-arm and regulating the speed of its forward movement as it follows the handle independently of the movement of the handle, whereby whether the handle be moved rapidly or slowly good contacts are obtained, as described, and a locking-bolt for holding the handle in any desired position.

2. The combination, substantially as described, of a transmitter which when operated by the movement of a handle transmits currents in succession through three line-wires, an electric telegraph-receiver consisting of three electro-magnets symmetrically arranged around a circle and each included in one of said wires, armatures to these magnets, a central axis with eccentric-pin, connecting-rods passing from the armatures to the eccentric-pin, and gear connecting the central axis with an axis on which is an index or pointer showing the signals upon a dial, as herein set forth, the return-wire, and the arc on the transmitter to which the return-wire is connected.

3. The combination of a transmitter having a contact-maker, a series of contacts, a handle yieldingly connected with the contact-maker, and a speed-controller connected with the contact-maker, for the purpose described, line-wires connected with said contacts, a receiver having an electro-magnet in each of said line-wires, and an indicator operated by said magnets, as set forth, and a return conductor with which all of said wires are connected after passing through their magnets, returning to the contact-maker of the transmitter, and circuit making and breaking devices for opening and closing the circuit of the return-conductor.

4. The combination of a transmitter having a contact-maker, a series of contacts, a handle yieldingly connected with the contact-maker, and a speed-controller connected with the contact-maker, for the purpose described, line-wires connected with said contacts, a receiver having an electro-magnet in each of said line-wires, and an indicator operated by said magnets, as set forth, a return-conductor with which all of said line-wires are connected after passing through their magnets, returning to the contact-maker of the transmitter, a magnet, R, in said conductor, contacts $U'$ $U^2$, included in a sub-circuit operated by said magnet R, and signal-bells in said sub-circuit at the transmitter and receiver.

5. The combination, substantially as described, in an electric-telegraph transmitter, of a contact-making arm, a series of contacts over which it travels and to any one of which it may be moved, an electric signaling-circuit in which the arm and contacts are included, a movable handle pivotally connected with the contact-making arm, the pulleys on the arm, the chains secured to the arm and passing over the pulleys, the spring-actuated drum to which the chains or cords are connected, the fly-wheel, gearing between the fly-wheel and the contact-making arm, the pivoted levers G, the spring connecting them at their upper end, and the pulleys on their lower ends, over which the chains pass which connect the contact-making arm with the operating-handle.

JAMES BONELLE WILLIS.

Witnesses:
 THOMAS WRIGHT ALDERTON,
 HENRY G. TEMPLETON.